United States Patent [19]
Roth et al.

[11] 3,953,228
[45] Apr. 27, 1976

[54] SEALED LITHIUM-REDUCIBLE SULFUR OXYHALIDE CELL

[75] Inventors: Walter L. Roth, Schenectady; Gregory C. Farrington, Elnora, both of N.Y.

[73] Assignee: General Electric Company, Schenectady, N.Y.

[22] Filed: Mar. 12, 1975

[21] Appl. No.: 557,583

[52] U.S. Cl. .......................... 136/6 FS; 136/6 LN; 136/83 R; 136/153
[51] Int. Cl.² .................................. H01M 10/00
[58] Field of Search .............. 136/6 FS, 6 LN, 83 R, 136/100 R, 153

[56] References Cited
UNITED STATES PATENTS

| | | | |
|---|---|---|---|
| 3,573,105 | 3/1971 | Weininger et al. | 136/86 |
| 3,713,897 | 1/1973 | Liang | 136/153 |
| 3,891,458 | 6/1975 | Eisenberg | 136/6 LN |

OTHER PUBLICATIONS

"Progress in Solid State Chemistry," No. 7, 1972, Section 5, pp. 149-151, J. T. Kummer.

"Journal of the Electrochemical Society," Vol. 120, No. 12, Dec. 1973, pp. 1613-1619, J. J. Auboin.

*Primary Examiner*—Howard S. Williams
*Assistant Examiner*—C. F. LeFevour
*Attorney, Agent, or Firm*—Paul R. Webb, II; Joseph T. Cohen; Jerome C. Squillaro

[57] ABSTRACT

A sealed lithium-reducible sulfur oxyhalide cell is described which comprises a casing, an anode positioned within the casing, the anode selected from the class consisting of lithium, lithium as an amalgam, and lithium in a non-aqueous electrolyte, a cathode positioned within the casing, the cathode consisting of a reducible sulfur oxyhalide, and a reducible sulfur oxyhalide with an ionic conductivity enhancing material, and a solid lithium-sodium aluminate electrolyte positioned within the casing between the anode and cathode and in contact within both the anode and cathode, the solid lithium-sodium aluminate electrolyte having an approximate composition of $LiNaO.9Al_2O_3$ of which 1.3 to 85% of the total alkali ion content is lithium.

5 Claims, 3 Drawing Figures

SEALED LITHIUM-REDUCIBLE SULFUR OXYHALIDE CELL

This invention relates to sealed cells and, more particularly, to such cells employing a lithium anode, a reducible sulfur oxyhalide cathode, and a solid lithium-sodium aluminate electrolyte.

Cross-reference is made to copending patent applications Ser. Nos. 517,511, 517,512 and 517,513 filed Oct. 24, 1974 in the names of Gregory C. Farrington and Walter L. Roth and entitled "Sealed Lithium-Bromine Cell", "Sealed Lithium-Iodine Cell", and "Sealed Lithium-Chlorine Cell", respectively.

Cross-reference is made to copending patent application Ser. No. 557,584 filed Mar. 12, 1975, in the names of Walter L. Roth and Gregory C. Farrington and entitled "Sealed Lithium-Reducible Phosphorous Oxyhalide Cell". The above four copending applications are assigned to the same assignee as the present application.

In allowed copending patent application Ser. No. 458,089, filed Apr. 5, 1974, entitled "Sealed Primary Sodium Halogen Battery" in the names of Gregory C. Farrington and Peter C. Lord, there is described and claimed a battery employing a sodium anode, a solid sodium ion-conductive electrolyte, and a cathode comprising thionyl chloride or thionyl chloride with various other conductivity-enhancing compounds.

In allowed copending patent application Ser. No. 485,092, filed Apr. 5, 1974, entitled "Sealed Primary Sodium-Halogen Cell" in the names of Gregory C. Farrington and Peter C. Lord, there is described and claimed a battery employing a sodium anode, a solid sodium ion-conductive electrolyte, and a cathode comprising sulfuryl chloride, sulfuryl chloride with aluminum chloride or sulfuryl chloride with ferric chloride. Neither of the above copending applications teaches a lithium-reducible sulfur oxyhalide cell with a lithium-sodium aluminate electrolyte with lithium ion conductivity. Both the above copending patent applications are assigned to the assignee as the present application.

In Weininger et al. Pat. No. 3,573,105, there is described a rechargeable non-aqueous alkali metal-halogen electrochemical cell which includes an alkali metal anode, a halogen cathode, a non-aqueous electrolyte, and an ion-permeable barrier to inhibit migration of halogen to the negative electrode between the electrodes. There is no specific lithium-sodium aluminate electrolyte between the electrodes which provides absolute separation between the electrodes including their respective liquid electrolytes or solvents excepting alkali ion transport. The electrolyte of the present invention prevents dendrites from piercing the electrolyte as opposed to the Weininger et al. barrier. The electrolyte of the present invention permits cell operation at temperatures above the polymer barrier stability of Weininger et al.

In Liang Pat. No. 3,713,897, there are described electrolyte materials for high voltage solid electrolyte battery systems. This patent describes a solid ion-conductive electrolyte material containing lithium iodide, lithium hydroxide and aluminum oxide. This patent does not describe or teach a solid ceramic electrolyte. Our electrolyte is not prone to destruction in non-aqueous solvents as opposed to the Liang patent material.

In "Progress in Solid State Chemistry", No. 7, edited by A. Reiss and J. O. McCaldin, published by Pergamon Press in 1972, there is a Section 5 entitled "$\beta$-Alumina Electrolytes" comprising pages 141–175. This Section 5 was authored by J. T. Kummer of the Ford Motor Company. Of particular interest in Section 5 are pgs. 149–151. On page 149, FIG. 7, equilibria are shown between $\beta$-alumina and various binary nitrate melts containing $NaNO_3$ and another metal nitrate at 300°–350° C. It will be noted from FIG. 7 that the equilibration of sodium beta-alumina with molten $LiNO_3$ results in the partial replacement of 50 percent of the sodium ion content by lithium ions. On page 151 it is discussed in lines 1–5 that the equilibration of sodium beta-alumina with molten $LiNO_3$ does not produce a complete replacement of sodium ions by lithium ions. However, it is further pointed out that complete lithium ion replacement of sodium ions in sodium beta-alumina can be effected by first exchanging sodium ions by silver ions and then silver ions by lithium ions in a melt of $LiNO_3$-LiCl. Throughout the above Kummer publication there is no recognition that the lithium-sodium $\beta$-alumina produced by equilibration of sodium beta-alumina with molten $LiNO_3$ is a unique and stable compound which can readily transport lithium ions without substantially altering its content of sodium ions.

An article entitled "Lithium Anode Cells Operating at Room Temperature in Inorganic Electrolytic Solutions" by James J. Auborn et al. appeared on pgs. 1613–1619 of the "Journal of the Electrochemical Society", Vol. 120, No. 12, December, 1973. A study of such cells is reported in the next article in the above Journal volume entitled "Lithium Inorganic Electrolyte Cells Utilizing Solvent Reduction" by Wishvender K. Behl et al. at pgs. 1619–1623.

In the above first article, there is described a first cell structure which has a solid cathode of active material, such as $CuF_2$ or $WO_3$, carbon powder and a binder on a nickel screen. The cathode is sealed in a nonwoven polypropylene envelope and positioned within a lithium anode folded to envelope the cathode on both sides. The lithium anode consists of a nickel screen pressed into a lithium foil. This structure is placed in a rectangular polyethylene jar. An electrolyte is added to complete the cell. The electrolyte consists of a solvent and a solute. The solvent is selected from phosphoryl chloride, $POCl_3$, sulfuryl chloride, $SO_2Cl_2$, or thionyl chloride, $SOCl_2$. The solute consists of $AlCl_3$, $AlBr_3$ or $LiAlBr_4$.

A second cell structure is described wherein the arrangement of the elements is similar to the arrangement in the first cell structure. The anode is identical and the woven separator is identical. The electrolyte has the same solvent and solute as the first cell structure. However, it additionally contains a reactant of chlorine or bromine. The cathode has a carbon, platinum or nickel current collector. The reactant for the cathode comprises the chlorine or bromine contained in the electrolyte.

A third cell configuration, which is similar in construction to the first and second cell configurations, is described in the second article. The anode is identical and the woven separator is identical. The cathode electrode consists of a mixture of carbon black and teflon binder pressed onto a nickel screen. The electrolyte consists either of $LiBCl_4$ dissolved in phosphoryl chloride, $POCl_3$, or $LiAlCl_4$ dissolved in thionyl chloride, $SOCl_2$. However, no additional oxidant is incorporated in the cell, the electrolyte itself serving as an ionic transport medium and oxidizing agent.

As opposed to the cell configurations and tests described in the above articles, the present invention relates to a sealed lithium-reducible sulfur oxyhalide cell which has a substantially different structure. The present invention is a sealed cell. Secondly, the anode is selected from the class of lithium, lithium as an amalgam, and lithium in a nonaqueous electrolyte. Thirdly, the present invention has an electrolyte of a solid lithium-sodium aluminate ion-conductive material as opposed to the liquid electrolyte of the above-described cell constructions.

Fourthly, in the above described cells, the electrolyte is in contact with both the cathode and the anode with no separator therebetween. The cathode is surrounded merely by a porous nonwoven envelope. Thus, the sealed lithium-reducible sulfur oxylhalide cell of the present application is substantially different from the above-described cells. Furthermore, in the above second cell configuration the electrolyte contains chlorine or bromine which liquid reactant comprises the cathode. Since the chlorine or bromine is in contact with both the anode and cathode there results a high rate of self-discharge due to the chlorine or bromine dissolved in the electrolyte. Further, there is a chemical interaction with the lithium anode to form the respective lithium bromide or lithium chloride salt. While some of this salt dissolves, more of this salt froms a solid precipitate in the cell.

Furthermore, in all the above cells, the electrolytes which are themsleves oxidizing agents, a property exploited in the third cell example described above, are in continuous contact with the lithium anodes. Lithium reacts with each of the electrolytes at a finite rate resulting in the build-up of an insulating layer on the lithium anode surface. This layer can severely diminish cell performance after lengthy storage. In addition, the direct reaction between the lithium anodes of the above cells and the inorganic electrolytes causes these cells to be less stable at elevated temperatures and completely unstable above the melting point of lithium metal, 181°C.

Our present invention is directed to a sealed lithium-reducible sulfur oxyhalide cell with positive separation of the anode and cathode by a solid lithium-sodium sodium aluminate electrolyte which is lithium ion conductive.

The primary object of our invention is to provide a sealed lithium-reducible sulfur oxyhalide cell which has high cell voltage, high energy density, a near-zero self-discharge rate, exceptionally long storage life, and stability at elevated temperatures.

In accordance with one aspect of our invention, a sealed lithium-reducible sulfur oxyhalide cell employs a lithium anode, a reducible sulfur oxyhalide cathode, and a solid lithium-sodium aluminate electrolyte which is a lithium-ion conductor therebetween.

These and various other objects, features and advantages of the invention will be better understood from the following description taken in connection with the accompanying drawing in which.

Figure 1:
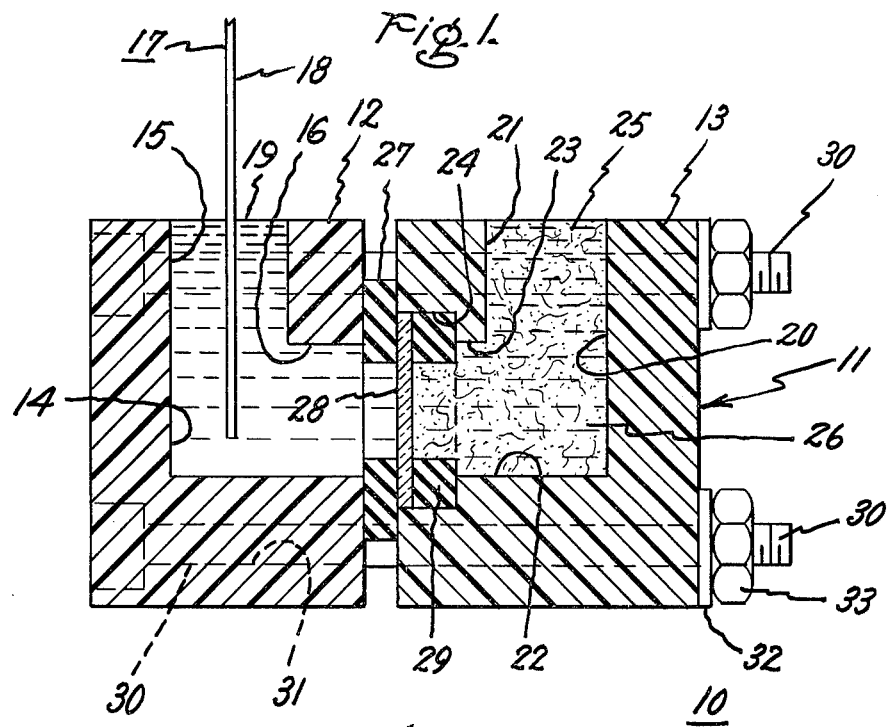
FIG. 1 is a sectional view of a lithium-reducible sulfur oxyhalide cell made in accordance with our invention.

In FIG. 1 of the drawing, there is shown generally at 10 a lithium-reducible sulfur oxyhalide cell embodying our invention. While we tested this open cell for operability, the cell for general use is sealed. The cell has a two part Teflon polymer casing 11 including an anode portion 12 and a cathode portion 13. Anode portion 12 defines a chamber 14 therein with an upper opening 15. An opening 16 is provided in one side wall. An anode 17 comprises a lithium metal foil 18 in a non-aqueous electrolyte or solvent 19 within chamber 14. Cathode portion 13 defines a chamber 20 therein with an upper opening 21. An opening 22 is provided in one side wall, which opening 22 is shown with a first portion 23 and a recessed portion 24. A cathode 25 comprises a reducible sulfur oxyhalide of thionyl chloride. Carbon felt 26 is also positioned within chamber 20 as a current collector. Appropriate electrical leads (not shown) are connected to anode 17 and cathode 25. Two part casing 11 has its anode portion 12 and cathode portion 13 positioned adjacent to one another and in communication with one another in a leak-proof manner by aligning openings 16 and 22 and positioning between the two portions a washer 27, for example, of silicone rubber. A solid lithium-sodium aluminate electrolyte 28 in the form of a disc is positioned against the outer surface of washer 27 and the outer surface of a similar silicone washer 29 fitted within recess 24 of opening 22. The two part casing 11 is held together tightly and in a leak-proof fashion by employing a pair of threaded fasteners 30 which extend through an appropriate opening 31 through both parts of casing 11. A washer 32 and a nut 33 are provided for the threaded end of each fastener to position the structure together. The above assembly results in a lithium-reducible sulfur oxyhalide cell which can be employed as a primary cell.

Figure 2:
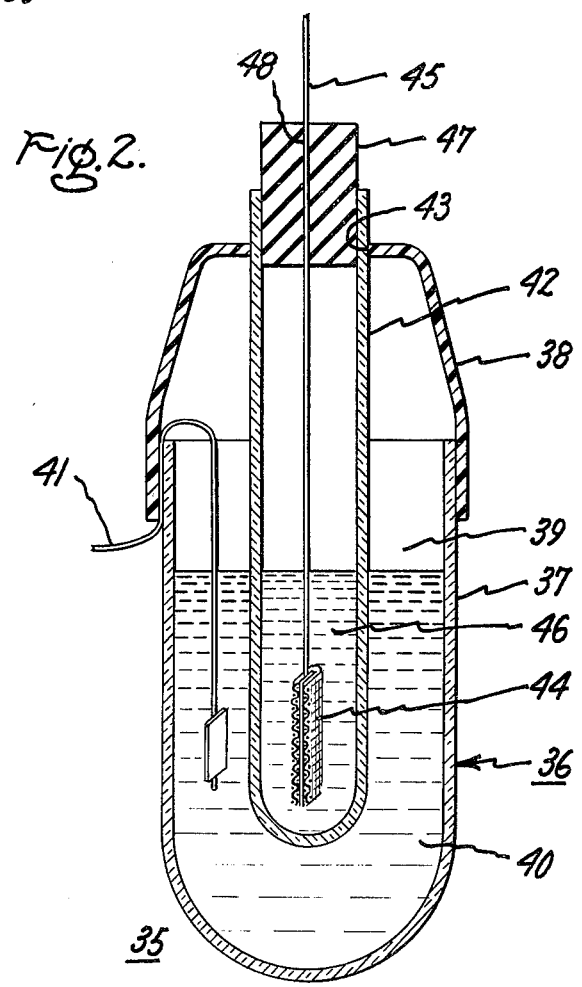
FIG. 2 is a sectional view of a modified lithium-reducible sulfur oxyhalide cell made in accordance with our invention.

In FIG. 2 of the drawing there is shown generally at 35 a modified sealed lithium-reducible sulfur oxyhalide cell embodying our invention. An outer casing 36 comprising a lower casing portion 37 of glass and an upper casing portion 38 of polyethylene affixed tightly to the upper open end of the lower casing portion 37 thereby provides a chamber 39 for a cathode 40 of thionyl chloride. An electrical lead 41 in the form of a platinum wire or graphite filament is immersed in cathode 40 and extends to the exterior of cell 35 through the junction of the lower and upper casing portions 37 and 38. An inner casing 42 in the form of a tube of solid lithium-sodium aluminate electrolyte is positioned within casing 37 and immersed partially in cathode 40. An opening 43 is provided in the top of upper casing portion 38 into which tube 42 fits tightly. An anode 44 of lithium metal in the form of a lithium ribbon pressed onto a nickel mesh which is folded together and attached to the end of a nickel electrical lead 45. An anolyte 46 partially fills tube 42 and is in contact with a lithium anode 44. An electrically insulating closure 47 with a hole 48 there-through is provided at the upper end of tube 42 to seal the initially open end of the tube. Lead 45 extends through hole 48 in closure 47 to the exterior of cell 35.

Figure 3:
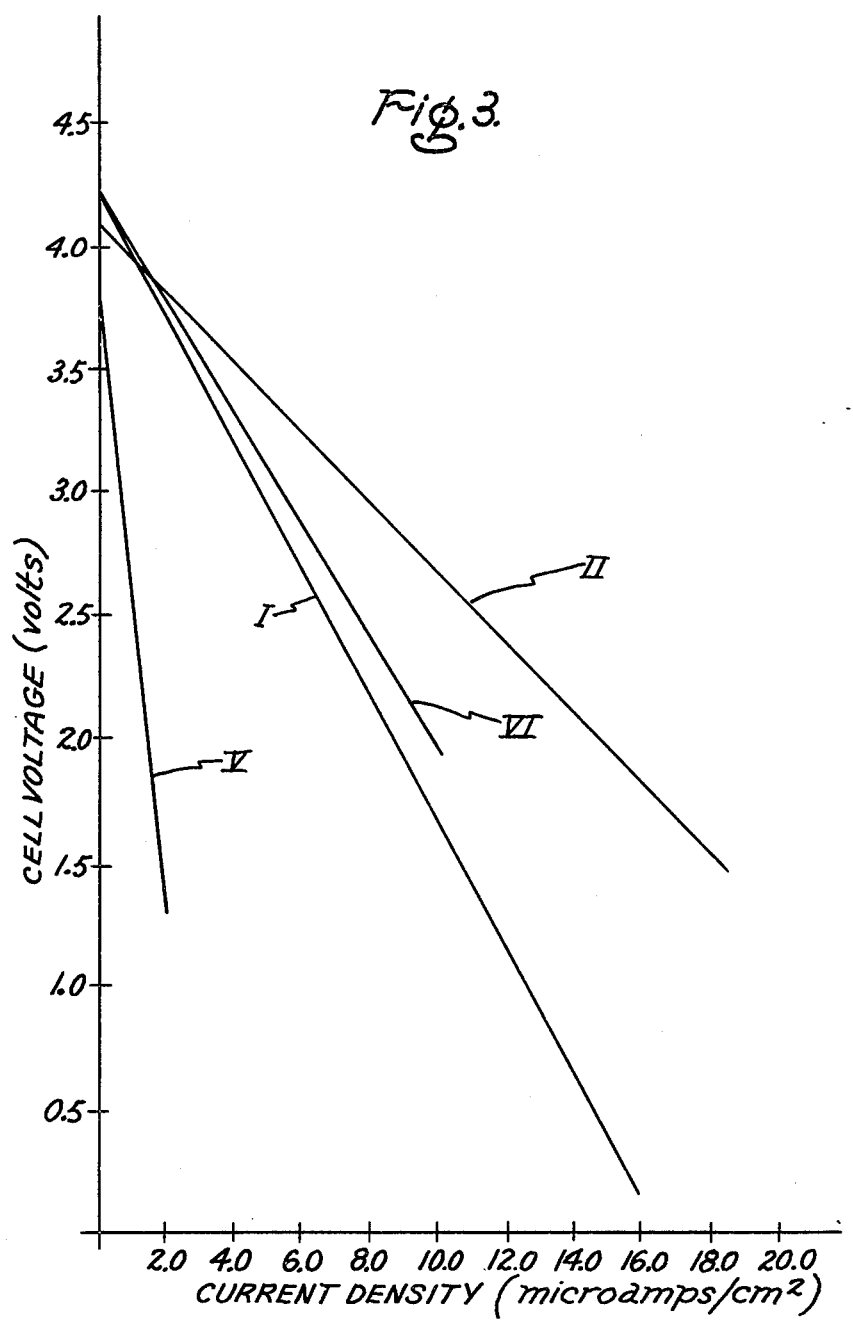
FIG. 3 is a set of polarization curves showing cell performances of the cell shown in FIGS. 1 and 2.

In FIG. 3, performances of the cells shown in FIGS. 1 and 2, respectively, are provided by polarization curves. In this Figure, cell voltage in volts is plotted against current density in microamperes per square centimeter.

We found that we could form a sealed lithium-reducible sulfur oxyhalide cell with a lithium ion-conductive electrolyte by employing a casing having a cathode portion and an anode portion. These two portions are separated by a solid lithium-sodium aluminate electrolyte in disc or tube form which will be further described below. Such a casing may be provided in various configurations such as for example shown in FIGS. 1 and 2. For purposes of showing the operability of our cell, we used first and anode portion and a cathode portion each of which had top and side openings as shown in FIG. 1. Since it was not necessary, the top openings were not sealed during assembly and testing. The casing material chosen was Teflon polymer. A silicone rubber washer was positioned in the recessed opening of the cathode portion and a solid lithium-sodium electrolyte was positioned adjacent the washer within the recessed opening. A silicone rubber washer was positioned between the casing portions. The side openings of the casing portions and the washers were aligned to provide for contact of the cathode with one surface of the solid electrolyte and for contact of the anode with the other surface of the electrolyte. We employed threaded fasteners to hold the casing portions together in a unitary cell structure. It will, of course, be appreciated that various other cell configurations can be employed, for example, as shown in FIG. 2. In addition to the Teflon polymer casing material various metals and non-metals can be used. Other materials can be substituted for the silicone washers. If desired, in the configuration, the solid electrolyte disc could be sealed by glass seals to the casing to separate the cathode from the anode as shown, for example, in above-mentioned U.S. Pat. No. 3,817,790.

We found further that we could form various modified sealed lithium-reducible sulfur oxyhalide cells embodying our invention. One such modified cell employs an outer casing comprising a lower casing portion of glass and an upper casing portion of a plastic such as polyethylene affixed tightly to the upper open end of the lower casing portion thereby providing a chamber for a cathode such as thionyl chloride. An electrical lead in the form of a platinum wire or graphite filament is immersed in the cathode and extends to the exterior of the cell through the junction of the lower and upper casing portions. An inner casing in the form of a tube of solid lithium-sodium aluminate electrolyte is positioned within the outer casing and immersed partially in the cathode. An opening is provided in the top of the upper casing portion into which the tube fits tightly. An anode of lithium metal in the form such as lithium ribbon pressed onto a nickel mesh is folded together and attached to the end of a nickel electrical lead. An anolyte partially fills the tube and is in contact with the lithium anode. An electrically insulating closure with a hole therethrough is provided at the upper end of the tube to seal the initially open end of the tube. The lead extends through the hole in the closure to the exterior of the cell.

For the anode we employ lithium, lithium as an amalgam or lithium in a non-aqueous electrolyte. For the cathode we can employ a reducible sulfur oxyhalide, or a reducible sulfur oxyhalide with an ionic conductivity enhancing material. We employ a solid lithium-sodium aluminate electrolyte between the cathode and anode to provide a solid barrier preventing contact between the electrodes and to provide lithium ion-conductivity.

We found unexpectedly that we could form solid lithium-sodium ion-conductive electrolytes with an approximate composition of $LiNaO \cdot 9Al_2O_3$ of which 1.3 to 85 percent of the total alkali content is lithium.

As it was discussed above in "Progress and Solid State Chemistry", J. T. Kummer, in Section 45 is described a lithium-sodium, $\beta$-alumina material, particularly on pgs. 149–151. Further, it is described in the article how to manufacture such material. As it will be particularly noted throughout the Kummer publication, there is no recognition that the lithium-sodium $\beta$-alumina produced by equilibration of sodium beta-alumina with molten $LiNO_3$ is a unique and stable compound which can readily transport lithium ions. We used such material containing 50 percent lithium ions as a solid electrolyte in our initial cells as shown in FIG. 1 and described above. The results of performance of these cells are shown in FIG. 3. Such electrolyte material containing 50 percent lithium ions appears to be the optimum amount of lithium ions in the material.

A range of 40 to 60 percent lithium ions in the electrolyte material with the remainder sodium ions provides the desirable conductivity for the operation of our cells. We found unexpectedly that we could obtain the desirable conductivity necessary for the operation of our cells by employing a broader range of 1.3 to 85 percent lithium ions in the electrolyte material with the remainder sodium ions. Tubes made of solid lithium-sodium aluminate electrolyte containing, respectively, 1.34 and 84.7 percent sodium ion substitution by lithium ions were used in later cells as shown in FIG. 2 and as described above. The results of performance of these cells are shown in FIG. 3.

We found further that for the cathode we could employ a reducible sulfur oxyhalide or a reducible sulfur oxyhalide with various ionic conductivity enhancing materials, such as chemically stable conductive salts or chemically stable conductive solvents. Suitable reducible sulfur oxyhalides include thionyl chloride, $SOCl_2$; sulfuryl chloride, $SO_2Cl_2$; sulfurous bromide, $SOBr_2$; sulfuryl pyrochloride, $S_2O_5Cl_2$; etc. Various ion conductivity enhancing materials include chemically stable conductive solvents such as sulfolane and chemically stable salts such as $AlCl_3$, $LiCl$, $AlBr_3$, $LiClO_4$, $LiCN$, $LiCNS$, tetra-alkylammonium perchlorates, halides, cyanides, thiocyanates, tetrafluoroborates and interhalogens such as $ICl$ and $IBr$.

Lithium is the lightest practical solid battery anode material and is also the most reducing. The lithium ion is a small and strongly polarizing ion. The salts of the lithium ions are generally more soluble in nonaqueous solvents than their sodium ion counterparts. Such high solubility helps eliminate salt precipitation on the faces of a solid electrolyte. Various nonaqueous electrolytes which are suitable with lithium include propylene carbonate, butyrolactone, tetrahydrofuran, acetonitrile, thionyl chloride, phosphorous oxychloride with a wide-variety of conductivity salts such as lithium perchlorate, lithium and tetraalkylammonium chlorides, perchlorates, cyanides, thiocyanates, tetrafluoroborates, and hexafluorophosphates.

Examples of lithium-reducible oxyhalide cells, which can be readily sealed or are sealed, made in accordance with our invention are set forth below

EXAMPLES I and II

Two cells, Nos. I and II, were assembled as generally described above and shown in FIG. 1 of the drawing. For each cell, a lithium-sodium aluminate electrolyte disc was made by first preparing a cylinder of $\beta$-alumina by firing $Na_2O+Al_2O_3$ plus 1 percent MgO at 1750°C. The density of the $\beta$-alumina cylinder was 3.224 g/cm³ corresponding to less than 1 percent void volume. Two discs of 1 mm thickness each were sliced from the cylinder and converted to a lithium-sodium aluminate electrolyte by immersion in molten $LiNO_3$ at 400°C for 24 hours. The exchange of the sodium ions for the lithium ions was accompanied by a 1.91 percent decrease in weight corresponding to approximately 50 percent sodium ion substitution by lithium ions and the final density was 3.148 g/cm³. X-ray diffraction showed that each electrolyte disc has a hexagonal crystal structure with lattice parameters $a = 5.603 \pm 0.001$ A and $c = 22.648 \pm 0.003$ A.

For each cell a two part Teflon polymer casing which included an anode portion and a cathode portion was employed to assemble the cell. Each portion had a chamber with an upper opening and a side opening. The side opening in one portion, the cathode portion, was further recessed. A silicone washer was positioned in the side opening of the cathode portion. The above prepared lithium-sodium aluminate electrolyte disc was positioned against the washer and within the recessed opening in the cathode portion. A silicone washer was positioned between the casing portions and the openings in the washer and in the casing portions were aligned. A pair of threaded fasteners were then employed to hold the casing portions together and tightened at one end by nuts. The chamber of the anode portion for each cell was provided with an anode consisting of an electrolyte of propylene carbonate with dissolved lithium perchlorate and tetrabutylammonium tetrafluoroborate. A lithium foil anode was then inserted therein and held in position in the chamber and in contact with the electrolyte. Thionyl chloride was placed in the cathode chamber of cell No. I to provide the cathode. Sulfuryl chloride saturated with aluminum chloride was placed in the cathode chamber of cell No. II to provide the cathode. Carbon felt was fitted into the chamber within the cathode portion of each to provide a current collector. These structures resulted in two lithium sulfur oxyhalide cells made in accordance with our invention which cells could be readily sealed. The open circuit voltage of cell No. I was 4.2 volts which the open circuit voltage of cell No. II was 4.1 volts.

EXAMPLES III and IV

The performance of the cells, Nos. I and II, of Examples I and II, are shown in the polarization curves in FIG. 3 of the drawing which were produced at temperatures of 27°C and 26°C, respectively. The cell voltage in volts is plotted against current in microamperes per square centimeter for each cell.

No attempts were made to minimize interfacial polarization at the lithium-sodium aluminate ion-conductive electrolyte interfaces.

EXAMPLES V and VI

Two cells, Nos. V and VI, were assembled as generally described above and as shown in FIG. 2 of the drawing. The cells were constructed in the same manner with the exception that one lithium-sodium aluminate tube, No. V, had a 84.7 percent lithium ion content while the other lithium-sodium aluminate tube, No. VI, had a 1.34 percent lithium ion content. The remaining alkali ion content of the tube was sodium ions.

The tube for cell No. V was formed from a tube of sodium β-alumina approximately 6.2 cm. long, 1.1 cm. OD, and 0.15 cm. wall thickness. The tube was baked out overnight at 1175°C prior to lithium ion exchange. The lithium ion exchange was made by immersion in lithium nitrate at 600°C for 13 hours. A resulting 3.12 percent weight decrease corresponded to 84.7 percent sodium substitution by lithium ions.

The tube for cell No. VI was formed from an identical sodium β-alumina tube which was baked out in the same manner. The lithium ion exchange was made by immersion in 20 mole percent lithium nitrate and 80 mole percent sodium nitrate at 400°C for 72 hours. A resulting 0.049 percent weight decrease corresponded to 1.34 percent sodium substitution by lithium ions.

For each cell, an outer casing was formed of a lower casing portion of glass and an upper casing portion of polyethylene affixed tightly to the upper open end of the lower casing portion thereby providing a chamber for the cathode of thionyl chloride. An electrical lead in the form of a platinum wire was immersed in the cathode and extended to the exterior of the cell through the junction of the lower and upper casing portions. An inner casing in the form of a tube of solid lithium-sodium aluminate electrolyte was positioned within the outer casing and immersed partially in the cathode. The tube for cell No. V contained 84.7 percent lithium ion content while the tube for cell VI contained 1.34 percent lithium ion content. An opening was provided in the top of each upper casing portion into which the respective tube fitted tightly. An anode of lithium metal in the form of a lithium metal ribbon pressed onto a nickel mesh was folded together and attached to the end of a nickel electrical lead. An anolyte of 0.1M tetrabutylammonium tetrafluoroborate in propylene carbonate saturated with $LiClO_4$ partially filled each tube and was in contact with the lithium anode. An electrically insulating closure with a hole therethrough was provided at the upper end of each tube to seal the initially open end of the tube. The lead extended through the hole in the closure to the exterior of the cell. These structures resulted in two sealed lithium sulfur oxyhalide cells made in accordance with our invention.

EXAMPLES VII and VIII

The performance of the cells, Nos. V and VI, of Examples V and VI, are shown in the polarization curves in FIG. 3 of the drawing which were produced at a temperature of 26°C. The cell voltage in volts is plotted against current in microamperes per square centimeter for each cell.

No attempts were made to minimize interfacial polarization at the lithium-sodium aluminate ion-conductive electrolyte interfaces.

While other modifications of the invention and variations thereof which may be employed within the scope of the invention have not been described, the invention is intended to include such as may be embraced within the following claims.

What we claim as new and desire to secure by Letters Patent of the United States is:

1. A sealed lithium-reducible sulfur oxyhalide cell comprises a casing, an anode positioned within the casing, the anode selected from the class consisting of lithium, lithium as an amalgam and lithium in an nonaqueous electrolyte, a cathode positioned within the casing, the cathode selected from the class consisting of a reducible sulfur oxyhalide, and a reducible sulfur oxyhalide with an ionic conductivity enhancing material, and a solid lithium-sodium aluminate electrolyte positioned within the casing between the anode and cathode and in contact with both the anode and cathode, the solid lithium-sodium aluminate electrolyte having an appropriate composition of $LiNaO \cdot 9Al_2O_3$ of which 1.3 to 85.0% of the total alkali ion content is lithium.

2. A sealed lithium-reducible sulfur oxyhalide cell as in claim 1, in which 40 to 60% of the total alkali ion content is lithium.

3. A sealed lithium reducible sulfur oxyhalide cell as in claim 1, in which 50% of the total alkali ion content of the solid lithium-sodium aluminate electrolyte composition is lithium.

4. A sealed lithium-reducible sulfur oxyhalide cell as in claim 1, in which the cathode in thionyl chloride.

5. A sealed lithium-reducible sulfur oxyhalide cell as claim 1, in which the cathode is sulfuryl chloride saturated with aluminum chloride.

* * * * *